US006434539B1

(12) United States Patent
Woodsum et al.

(10) Patent No.: US 6,434,539 B1
(45) Date of Patent: *Aug. 13, 2002

(54) METHOD AND APPARATUS FOR DETERMINING AND FORMING DELAYED WAVEFORMS FOR FORMING TRANSMITTING OR RECEIVING BEAMS FOR AN ACOUSTIC SYSTEM ARRAY OF TRANSMITTING OR RECEIVING ELEMENTS FOR IMAGING IN NON-HOMOGENOUS/NON-UNIFORM MEDIUMS

(75) Inventors: Harvey C. Woodsum, Bedford; William Hogan, Mont Vernon; John A. Gaidos, Somersworth, all of NH (US)

(73) Assignee: Sonetech Corporation, Bedford, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/295,281

(22) Filed: Apr. 20, 1999

(51) Int. Cl.[7] ............................ G06F 15/18; H01Q 3/22
(52) U.S. Cl. ......................................... 706/13; 342/373
(58) Field of Search ............................ 706/13; 342/373

(56) References Cited

U.S. PATENT DOCUMENTS

| | | | | | |
|---|---|---|---|---|---|
| 4,169,257 | A | * | 9/1979 | Smith | 367/123 |
| 5,140,530 | A | * | 8/1992 | Guha et al. | 706/13 |
| 5,222,192 | A | * | 6/1993 | Shaefer | 706/13 |
| 5,255,345 | A | * | 10/1993 | Shaefer | 706/13 |
| 5,285,789 | A | * | 2/1994 | Chen et al. | 600/459 |
| 5,319,781 | A | * | 6/1994 | Syswerda | 706/13 |
| 5,339,281 | A | * | 8/1994 | Narendra et al. | 367/5 |
| 5,394,509 | A | * | 2/1995 | Winston | 706/13 |
| 5,680,371 | A | * | 10/1997 | Miklovic | 367/123 |
| 5,822,276 | A | * | 10/1998 | Miklovic | 367/103 |
| 5,952,965 | A | * | 6/1999 | Kowalski | 342/372 |
| 6,081,796 | A | * | 6/2000 | Takagi et al. | 706/13 |
| 6,175,331 | B1 | * | 1/2001 | Woodsum et al. | 342/373 |

OTHER PUBLICATIONS

Wang et al.; "Optimum Subarray Configuration Using Genetic Algorithms". IEEE[online], Proceedings on the 1998 IEEE International Conference on Acoustics, Speech and Signal Processing, May 1998, vol 4, pp 2129–2132.*
Odell et al.; "A Versatile Integrated Acoustic Beamforming System". IEEE[online], IEEE Pacific Rim Conference on Communications, Computers and Signal Processing, May 1991, vol 2, pp 635–638.*
Proudler, I.K.; "Real–time, Least–squares Adaptive Acoustic Beamforming: A Design Study". IEEE[online], Workshop on VLSI Signal Processing, Oct. 1992, pp 449–458.*
Vaughan, R.G.; "Beam Spacing for Angle Diversity". IEEE [online], IEEE Global Telecommunications Conference, Nov. 1998, vol 2, pp 928–933.*

* cited by examiner

*Primary Examiner*—George B. Davis
*Assistant Examiner*—Kelvin Booker
(74) *Attorney, Agent, or Firm*—Davis & Bujold, P.L.L.C.

(57) ABSTRACT

An acoustic imaging system for forming acoustic beams approximating an optimum acoustic beam for the directional transmission or reception of acoustic energy. Maximum and minimum dependent beamform factors are determined from initial beamform factors and an initial parent population of chromosomes is generated, each chromosome including a gene corresponding to a dependent beamform factor and representing an initial candidate beam and subsequent parent populations are generated by cloning of the surviving populations. A child population is generated by exchanging statistically selected pairs of genes of the parent population and generating a mutated population. A surviving population is selected from the mutated population of the mutated population with a fitness criteria. When a chromosome of the surviving population meets the solution criteria, the genes of the surviving population having the best match to the fitness criteria are selected to forming a beam.

13 Claims, 8 Drawing Sheets

METHOD AND APPARATUS FOR DETERMINING AND FORMING DELAYED WAVEFORMS FOR FORMING TRANSMITTING OR RECEIVING BEAMS FOR AN ACOUSTIC SYSTEM ARRAY OF TRANSMITTING OR RECEIVING ELEMENTS FOR IMAGING IN NON-HOMOGENOUS/NON-UNIFORM MEDIUMS

FIELD OF THE INVENTION

The present invention relates to a method and apparatus for determining waveform factors for forming transmitting and receiving beams for an array of transmitting or receiving elements in an acoustic system for imaging in non-homogenous or non-uniform mediums and, in particular, wherein the number of waveform delays required to form the optimal transmitting or receiving beams is greater than the number of signal channels for providing the waveforms to the transmitting elements or collecting from the receiving elements.

BACKGROUND OF THE INVENTION

There are many acoustic imaging systems that require the controlled, directional transmission or reception of sound energy in non-homogenous or non-uniform mediums and in frequency ranges extending from the ultrasonic frequencies and through the audible frequencies to the sub-audible frequencies. Examples of such could range from ultrasonic medical imaging systems to geological imaging or profiling systems and are characterized in that the medium or environment in which the imaging or profiling is to be performed is non-homogenous or non-uniform. That is, the mediums through which such systems form transmitting and receiving beams are non-homogenous, being comprised of layers or bodies or masses of differing materials, and as a consequence have transmission characteristics that vary significantly and non-uniformly from point to point through the medium. For example, ultrasonic medical imaging systems are required to form imaging transmission or receiving beams in the human body, which is a complex structure formed of bone, muscle, fluids and other tissues. Geological imaging and profiling systems are likewise required to form imaging receiving beams in a medium formed of layers and masses of different rocks, soils and liquids typically having widely varying transmission characteristics. In contrast, air acoustic systems, sonar systems and radar systems operate in mediums that are relatively homogenous and uniform. That is, the mediums in which they operate, such as air or water, are comprised of the same substance throughout and, as a consequence and although the transmission characteristics of the air or water may vary noticeably from point to point, have relatively uniform transmission characteristics compared to the human body or geological structures. It will therefore be apparent that the beamforming requirements imposed on acoustic systems for operating in non-homogenous and non-uniform mediums, hereafter referred to as non-homogenous/non-uniform acoustic systems, are often more stringent than those imposed on systems operating in homogenous or uniform mediums. For example, non-homogenous/non-uniform acoustic imaging systems are frequently required to form transmitting or receiving beams that "look around, through or between" the components of complex structures made of substances having widely varying characteristics.

One common technique for the controlled, directional transmission or reception of acoustic energy in non-homogenous/non-uniform acoustic imaging systems is the use of arrays of acoustic transmitting and receiving elements, which are often referred to as "phased arrays". In this method, the elements of an array, which are generally but not necessarily identical units, are arranged in a predetermined two or three dimensional geometric relationship and the directional pattern or patterns of transmission or reception of the array, often referred to as "beams", are determined by the combination of the patterns of transmission or reception of the individual elements of the array. In particular, the directions and shapes of the beams are determined by the transmission and reception patterns of the individual elements, the geometric relationship between the elements and the phase relationships among the signals used to drive the elements or received from the elements. Of these, the geometric arrangement of the elements and the characteristics of the elements are generally fixed and the phase relationships among the signals driving or received from the elements are typically controlled to form and direct the "beams" of the array.

It is well understood that a phased array in a non-homogenous/non-uniform acoustic imaging system can form a transmitting or receiving beam of a desired pattern or shape and can direct the beam in an arbitrary direction by appropriate selection and control of the phase relationships among the transmitted or received signals. In a typical phased array non-homogenous/non-uniform acoustic imaging system, the selection and control of the phase relationships among the signals is accomplished by selection and control of time delays through the signal channels through which driving signals are provided to the array elements or the received signals are received from the array elements. It is commonly understood that if each element is provided with its own independent signal channel these delays can be chosen optimally to provide the best possible beam, subject to the physical constraints of the geometry of the array, the number and characteristic of the array elements and the signal waveforms. This result can also be achieved where the number of available signal channels is greater than the number of array elements, or when the geometry of the array is symmetric with respect to the desired beam or beams so that the number of required unique delays is reduced to less than the number of signal channels and so that, for example, one channel can be used for more than one array element.

It is a commonly occurring problem, however, that the number of required delays is greater than the number of available signal channels and it is then necessary for at least some of the array elements to share one or more of the channels, that is, to be grouped or wired together and connected to a channel. In such instances, each such group of array elements connected from a single signal channel operates as a single array element and it is often difficult to obtain the optimum beam or beams from the array, or even a close approximation of the optimum beams. It is possible in theory, however, to obtain a beam or beams that are close to the optimum beam or beams if the Nyquist criterion for spatial sampling can be satisfied by the array and if appropriate groupings of the array elements and corresponding signal channel delay times can be determined and implemented in a realizable system.

In general, the methods of the prior art for determining groupings of acoustic array elements and sets of signal channel delay times have attempted to find the array element groupings and channel delay times that provide beams that match, as closely as possible, the beams formed in the optimum situation wherein the number of available signal channels is equal to the number of array elements. In those instances wherein the optimum required delays fall into localized clusters of values such that the number of such clusters of values is equal to or less than the number of available signal channels, a reasonable solution is to choose a delay time for each channel that is equal to the center, or average, of a corresponding cluster of delay time values and, thereby, the corresponding group of array elements. In general, however, the set of optimum delay time values will be irregularly scattered between some minimum value and some maximum value and the selection of a set of delay times that optimally approximates the optimum delay time values is unobvious and difficult, at best.

One method that has been used to find a set of delay times that acceptably approximate the optimum delay time values has been to find a set of delay times that minimizes the sum of the squares of the differences between each optimum delay time value and the closest delay of the set of approximate delay times. Determining such a set is a non-linear problem, however, since small changes in the delay times selected to represent the optimum delay time values may cause a change in the correspondence between any given optimum delay time value and the delay time that represents that optimum delay time value, in effect causing an array element to move from one group of array elements to another group of array elements. This non-linearity renders the usual approaches to such problems, such as least squares approximation, ineffective.

The present invention provides a solution to these and other problems of the prior art by providing a method for determining the groupings of acoustic array elements and the corresponding signal channel delay times to allow the selectable and arbitrary formation and steering of beams by a non-homogenous/non-uniform acoustic imaging system, and a mechanism for controlling the distribution of appropriately delayed waveforms to the groups of array elements, assuming that there are no arbitrary array element grouping constraints, that is, that any element may be grouped with any other element or group of elements.

SUMMARY OF THE INVENTION

The present invention is directed to a method for use in a non-homogenous/non-uniform acoustic imaging system for determining beamform factors for forming acoustic beams approximating an optimum acoustic beam for the directional transmission or reception of acoustic energy by a non-homogenous/non-uniform acoustic imaging system wherein the non-homogenous/non-uniform acoustic imaging system includes a first plurality of acoustic elements connectable to a second plurality of signal channels wherein the first plurality is greater than the second plurality, and an apparatus for use in a non-homogenous/non-uniform acoustic imaging system for performing the method of the present invention.

The method of the present invention includes the steps of determining, from a set of initial beamform factors, at least one dependent beamform factor of at least one optimum beam to be formed by the non-homogenous/non-uniform acoustic imaging system, and determining the maximum and minimum values of the dependent beamform factors. The method then generates a parent population of chromosomes wherein each chromosome includes a gene for and corresponding to each dependent beamform factor and represents a candidate beamformed by the phased array non-homogenous/non-uniform acoustic imaging system for the initial beamform factors and the dependent beamform factors represented by the genes of the chromosome. According to the present invention, the generation of a parent population is accomplished by generating a first parent population wherein the value of each gene corresponding to a dependent beamform factor has a value between the maximum and minimum values of the corresponding dependent beamform factor and by generating a subsequent parent population by cloning of the chromosomes of a surviving population.

The method of the present invention then generates a child population from the parent population by exchanging statistically selected pairs of genes of the chromosomes of the parent population and generating a mutated population from the child population by mutating statistically selected genes of the child population. A surviving population is then selected from the mutated population by comparing the chromosomes of the mutated population with a fitness criteria based upon at least one optimum beamform factor and selecting for the surviving population the chromosomes of the mutated population meeting the fitness criteria.

Finally, the method of the present invention compares the chromosomes of the surviving population with a solution criteria and, when at least one chromosome of the surviving population meets the solution criteria, provides the genes of the chromosome of the surviving population having the best match to the fitness criteria as the dependent beamform factors for forming a beam approximating the optimum beam.

According to the present invention, the solution criteria may be a predetermined number of iterations of the generation of a surviving population. Alternatively, the solution criteria may be a predetermined tolerance of difference between a chromosome of a current surviving population having the best match to the fitness criteria and a chromosome of a preceding surviving population having the best match to the fitness criteria wherein the solution criteria is met when the difference between the chromosome having the best match to the fitness criteria of the current surviving population is within the predetermined tolerance of difference from the chromosome of the preceding surviving population. In yet another implementation, the fitness criteria may be a predetermined tolerance of difference between a beamform factor determined by the genes of a chromosome of a current surviving population and the optimum beamform factors.

In further implementations of the present invention, each parent generation may be generated to have a constant number of chromosomes and the chromosomes of each surviving population may be cloned to generate a new parent population so that the proportionate representation of each chromosome of a surviving population in a new parent population is proportionate to a measure of fitness of the chromosome of the surviving population with respect to the fitness criteria.

In yet further implementations of the present invention, a chromosome of a surviving population may be selected to that the chromosome of a surviving population having a best measurement of fitness with respect to the fitness criteria will be represented in the parent population cloned from the surviving population.

In yet further implementations of the invention, each chromosome of a child population may be generated by statistical selection and exchange of genes of chromosomes of the parent population and each mutated generation may be generated by statistical selection and variation of the values of the genes of corresponding chromosomes of the child generation within predetermined limits.

The present invention further includes a non-homogenous/non-uniform acoustic imaging system implementing the present invention wherein the non-homogenous/non-uniform acoustic imaging system includes a beamform processor including a memory and a processor for executing the beamform process and generating from initial beamform factors first and second dependent beamform factors. The non-homogenous/non-uniform acoustic imaging system further includes a waveform processor connected to the signal channels and responsive to the first dependent beamform factors for applying the first dependent beamform factors to a corresponding second plurality of element group signals, an array switch connected between the signal channels and the array elements and responsive to the second dependent beamform factors for selectively connecting the signal channels to the array elements of the element groups, and a switch configuration table connected from the beamform generator and to the array switch for storing and providing to the array switch the second dependent beamform factors.

The beamform process executed by the beamform generator includes determining from a set of initial beamform factors at least one dependent beamform factor of at least one optimum beam to be formed by the non-homogenous/non-uniform acoustic imaging system, determining the maximum and minimum values of the dependent beamform factors, and generating a parent population of chromosomes wherein each chromosome includes a gene for and corresponding to each dependent beamform factor and represents a candidate beamformed by the phased array non-homogenous/non-uniform acoustic imaging system for the initial beamform factors and the dependent beamform factors represented by the genes of the chromosome. The process of generating a parent population includes generating a first parent population wherein the value of each gene corresponding to a dependent beamform factor has a value between the maximum and minimum values of the corresponding dependent beamform factor and generating a subsequent parent population by cloning of the chromosomes of a surviving population.

The process includes generating a child population from the parent population by exchanging statistically selected pairs of genes of the chromosomes of the parent population, and generating a mutated population from the child population by mutating statistically selected genes of the child population. The process further includes selecting the surviving population from the mutated population by comparing the chromosomes of the mutated population with a fitness criteria based upon an optimum beamform factor and selecting for the surviving population the chromosomes of the mutated population meeting the fitness criteria. The process then includes comparing the chromosomes of the surviving population with a solution criteria and, when at least one chromosome of the surviving population meets the solution criteria, providing the genes of the chromosome of the surviving population having the best match to the fitness criteria as the first and second dependent beamform factors for forming a beam approximating the optimum beam.

In many non-homogenous/non-uniform acoustic imaging systems, the waveform processor is a signal generator and a signal processor and the corresponding second plurality of element group signals are signals to be emitted by the array elements of the corresponding element groups and signals received by the array elements of the corresponding element groups.

Other features, objects and advantages of the present invention will be understood by those of ordinary skill in the relevant arts after reading the following descriptions of a presently preferred embodiment of the present invention, and after examination of the drawings, wherein:

DESCRIPTION OF A PRESENTLY PREFERRED EMBODIMENT

Figure 1:
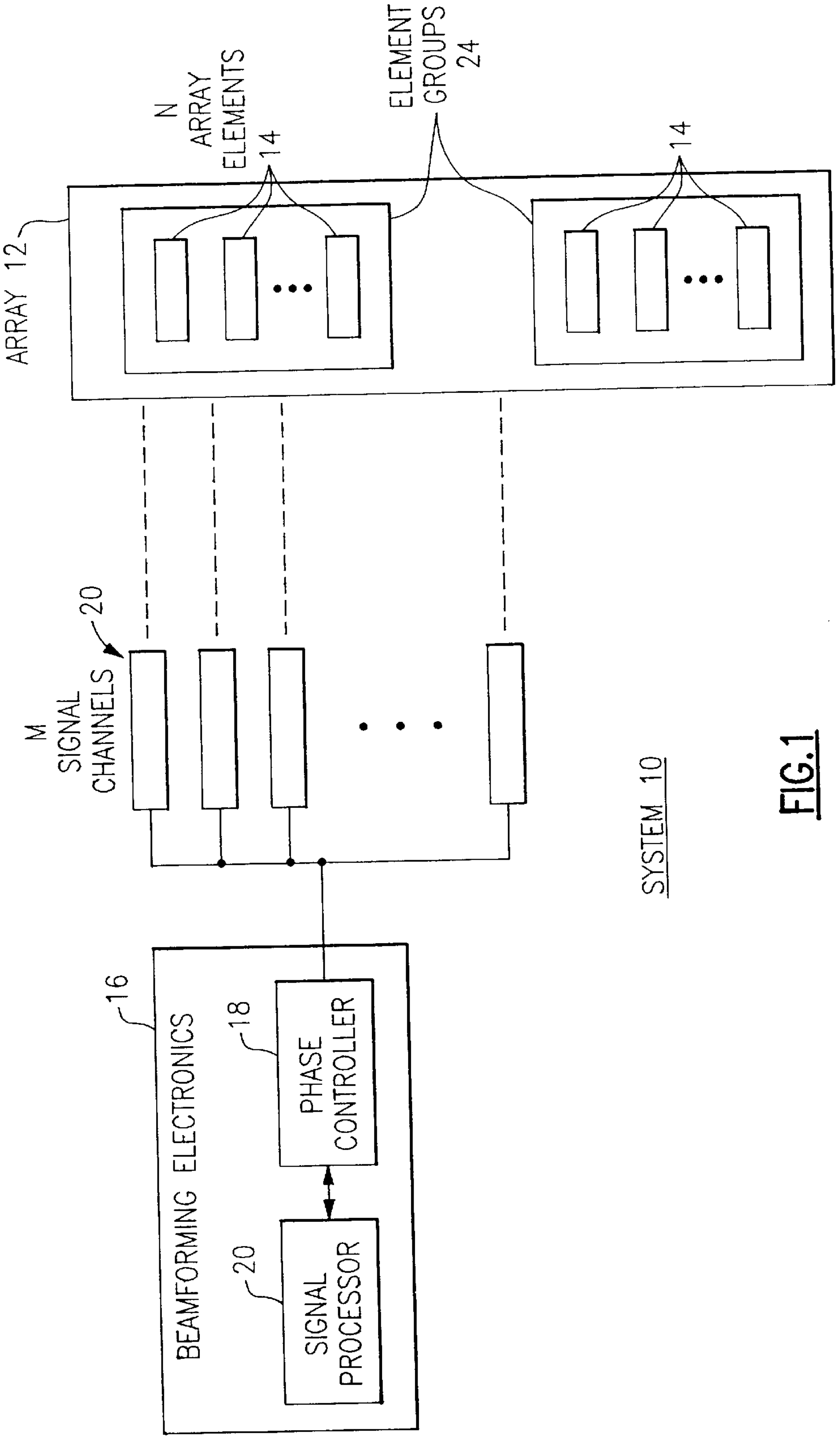
FIG. 1 is a generalized diagram of a phased array non-homogenous/non-uniform acoustic imaging system that may be constructed using the present invention.

Referring to FIG. 1, therein is presented a generalized diagram of a Phased Array Non-homogenous/Non-uniform Acoustic Imaging System 10 that may be constructed using the present invention wherein Non-homogenous/Non-uniform Acoustic Imaging System 10 may be a part of a non-homogenous/non-uniform acoustic imaging system requiring the controlled, directional transmission or reception of acoustic energy.

As represented in FIG. 1, Non-homogenous/Non-uniform Acoustic Imaging System 10 includes an Array 12 that is comprised of a plurality of Array Elements 14 which are geometrically arranged in two or three dimensional space according to the beam or beams that are desired to be formed and the transmitting or receiving characteristics of Array Elements 14. For example, Array Elements 14 may be arranged singly or in groups along a straight or curved line or in groups extending across such a line or in any arbitrary pattern on any two or three dimensional surface, such as a cylinder or sphere, or may be distributed in any manner throughout any two or three dimensional space. Array Elements 14 may be arranged in a regular, even pattern or in a pattern having variable spacing between the elements, such as an array wherein the elements are spaced closely near the middle of the array and further apart near the edges of the array. Each of Array Elements 14 may be omnidirectional or may have a directional radiation or receiving pattern, and while Array Elements 14 are often identical units, Array Elements 14 may be comprised of a plurality of different units having different characteristics. The design and construction of such arrays of Array Elements 14 for different applications will be well understood by those of ordinary skill in the relevant arts, however, and need not and will not be discussed in further detail herein.

As also represented in FIG. 1, Array Elements 14 are connected to Beamforming Electronics 16 that generates signals to be transmitted by Array Elements 14 or processes signals received by Array Elements 14, or both, depending upon the particular system. In general, and as will be described further in a following discussion, Beamforming Electronics 16 will include a Phase Control 18 for controlling the signal channel delay times for the signals sent to or received from Array Elements 14 to control the phase relationships between the signals and thereby control the formation and steering of the transmitting or receiving beams formed by Non-homogenous/Non-uniform Acoustic Imaging System 10. Beamforming Electronics 16 will also in many instances include a Signal Processor 20 for controlling other characteristics of the signals sent to or received from Array Elements 14. For example, Signal Processor 20 may weight each of the signals by applying an amplification factor to increase or decrease the relative magnitudes of each of the signals, thereby providing additional control of the contribution of each signal to the formation of a transmitting or receiving beam.

As illustrated in FIG. 1, the signals are communicated between Beamforming Electronics 16 and Array Elements 14 through Signal Channels 22 which may be, for example, wires, waveguides or other electrical or optical transmission paths, and wherein it is assumed for purposes of description of the present invention that the number M of Signal Channels 22 is less than the number N of Array Elements 14. As such, Array Elements 14 are grouped into Element Groups 24 wherein the Array Elements 14 in each of Element Groups 24 are connected to a corresponding one of Signal Channels 22.

Figure 2A:
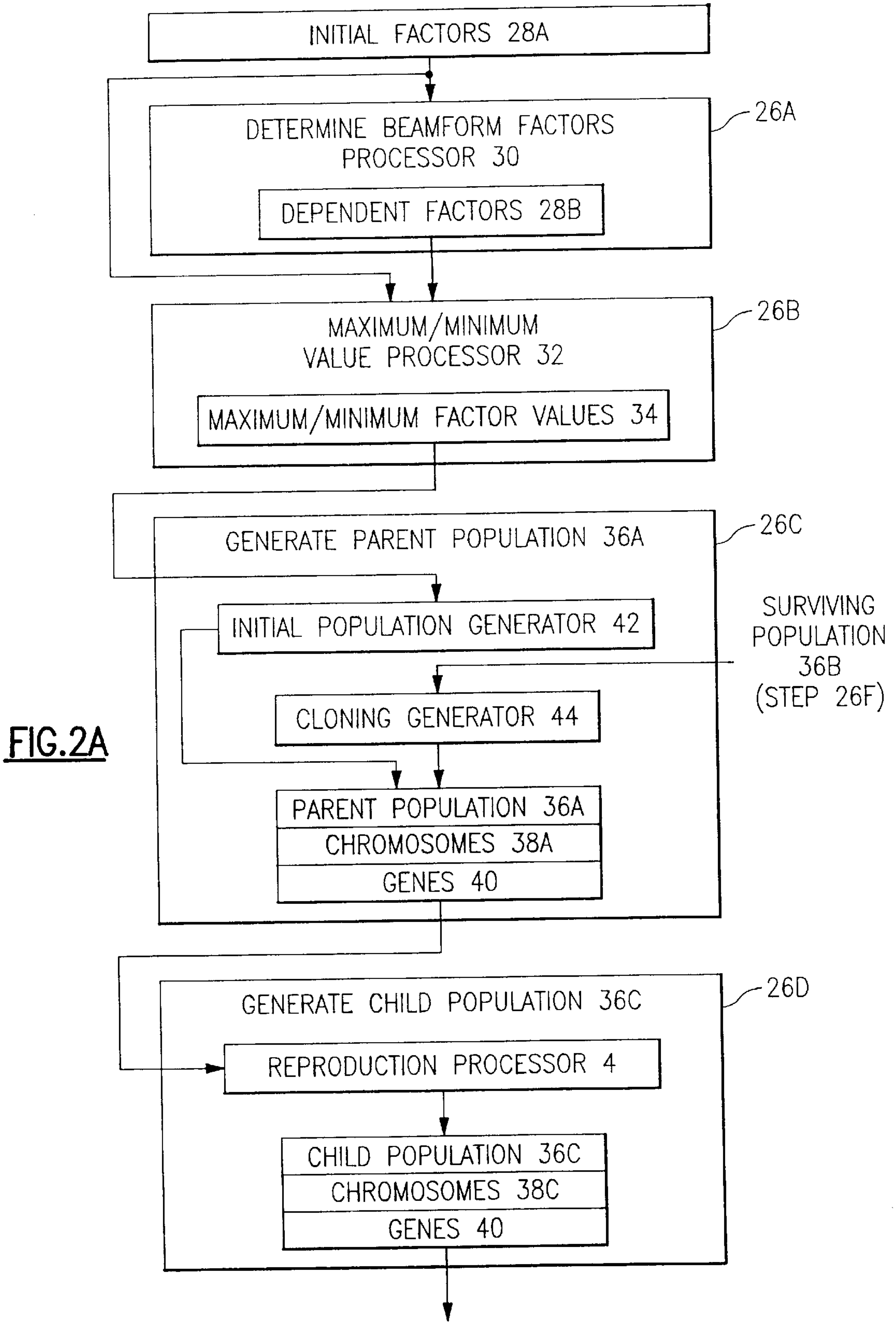
FIGS. 2A and 2B are a flow diagram and block diagram illustrating the method and apparatus of the present invention.
Figure 2B:
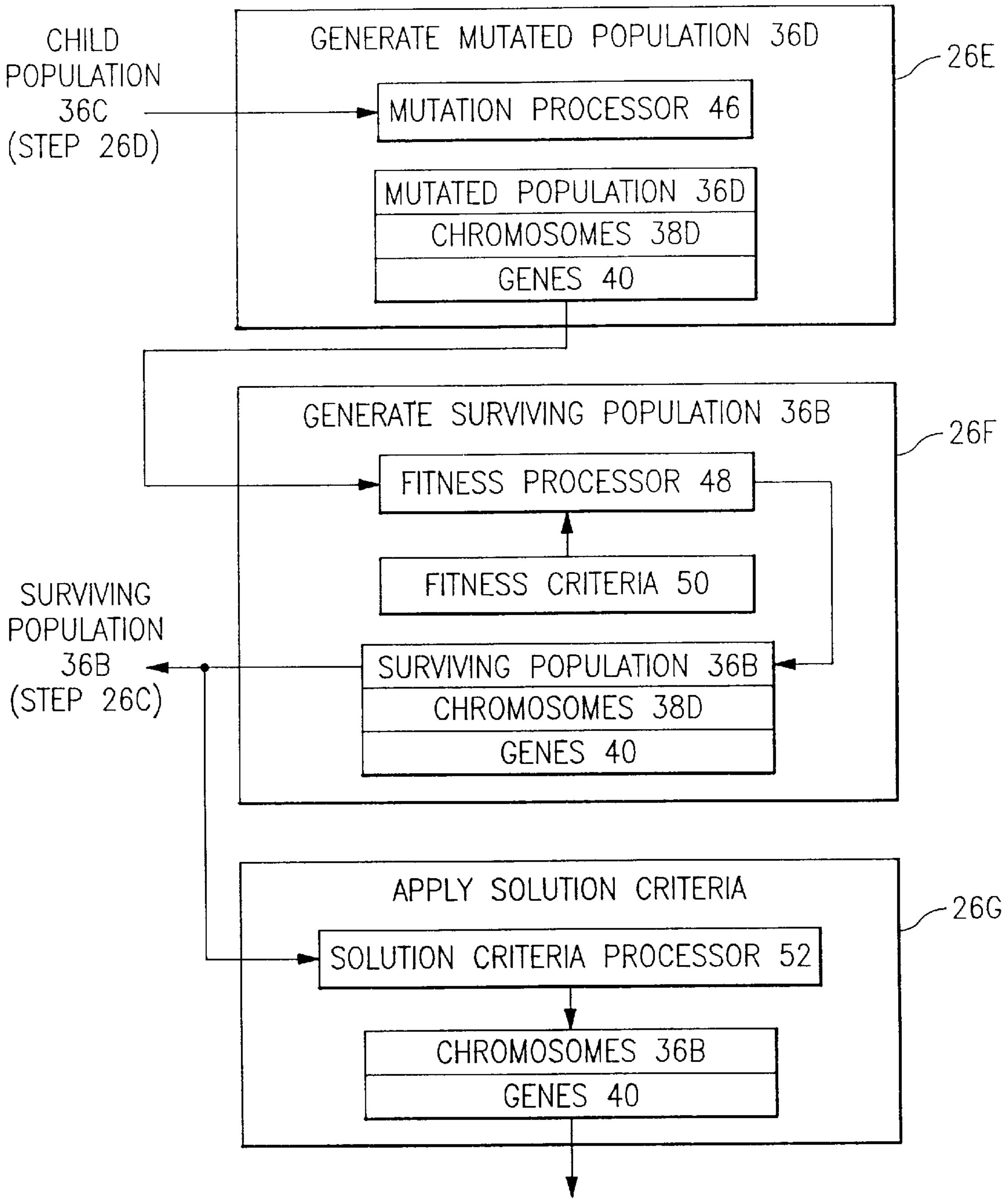

Referring to FIGS. 2A and 2B, therein is illustrated the method and apparatus of the present invention for determining the M Element Groups 24 of N Array Elements 14 and the corresponding optimal M signal channel delay times of Signal Channels 22 to allow the desired formation and steering of beams by Non-homogenous/Non-uniform Acoustic Imaging System 10. In the presently preferred embodiment, and as illustrated in the program listings of Appendix A, which are written in the MATLAB™ programming language from The Math Works, the method of the present invention is implemented under program control executing on, for example, a personal computer or other computer associated with the system that Non-homogenous/Non-uniform Acoustic Imaging System 10 is associated. Also, and while the method of the present invention is illustrated in FIGS. 2A and 2B for an implementation in which the array element groupings and corresponding signal channels and delay times are determined for one beam at a time, the process to be repeated for each beam to be generated by the array, the expansion of the program implementation for the determination of the array element groupings, signal channels and delay times for multiple beams currently or in parallel will be well understood by those or ordinary skill in the arts and will depend, at least in part, on the capabilities of the computer system on which the method is implemented.

As illustrated therein in Step 26A the system is provided with or determines the optimum Beam form Factors 28, such as the optimum time delays, for an optimum beam to be formed by an Array 12 under the initial assumption that there is a Signal Channel 22 for and corresponding to each Array Element 14 so that Beam form Factors 28 for the signal provided to or received from each Array Element 14 can be independently controlled to form the optimum beam. Beam form Factors 28 are essentially the parameters of the system and the components thereof, such as Array Elements 14 and the arrangement of Array Elements 14, that define the transmitting or receiving beamformed by the Array 12 and the associated Beamforming Electronics 16. Beam form Factors 28 may include, for example, the pattern and direction of a beam to be formed by the Array Elements 14 of the Array 12, initial assumptions or determinations of the geometric arrangement of Array Elements 14, of the Array Elements 14 that are members of each Element Group 24, and of the relationships, or connections, between Signal Channels 22 and Element Groups 24, and, at least the optimum Delay Times 30 for each Element Group 24 and corresponding Signal Channel 22. Other factors may include, for example, the transmission/reception characteristics of Array Elements 14 and the frequency or frequencies and waveforms of the signals to be transmitted or received.

As indicated in Step 26A in FIG. 2A, certain of Beam form Factors 28 may be Initial Factors 28A which are determined or assumed initially and may include, for example, the pattern and direction of a beam to be formed, the geometric arrangement of Array Elements 14, the members of each Element Group 24 and the relationships between Signal Channels 22 and Element Groups 24, the transmission/reception characteristics of Array Elements 14 and the frequency or frequencies and waveforms of the signals to be transmitted or received. Other Beam form Factors 28, indicated in FIG. 2 as Dependent Factors 28B, are determined from the Initial Factors 28A by a Determine Beam form Factors Process 30 and comprise the values of Beam form Factors 28 that, given Initial Factors 28A, will result in the desired optimum beam being formed by Array 12. Dependent Factors 28B may typically include at least the optimum Delay Times 32, although Dependent Factors 28B may, in many instances, include at least certain of the Beam form Factors 28 recited just above as possibly belonging to Initial Factors 28A.

In Step 26B, a Maximum/Minimum Value Process 32 accepts Dependent Factors 28B from Step 26A and determines the Maximum and Minimum Factor Values 34 of Dependent Factors 28B that are required to create the optimum beam or that will result in the optimum beam. As described above, these maximum and minimum factor values may typically include at least the maximum and minimum values of the optimum Delay Times 32 but may also include any of, for example, values representing the geometric positions of Array Elements 14, the selection of Array Elements 14 of Element Groups 24, the relationships between Signal Channels 22 and Element Groups 24, the orientations of Array Elements 14 relative to the beam and the frequency or frequencies and waveforms of the signals to be transmitted or received.

In Step 26C, the system generates a Parent Population 36A of Chromosomes 38A wherein each Chromosome 38A represents a candidate beam that could be formed by Non-homogenous/Non-uniform Acoustic Imaging System 10 and wherein there are a predetermined number of Chromosomes 38A, for example, 50, in Parent Population 36A. Each Chromosome 38A includes one or more Genes 40 wherein, in the most general implementation, each Gene 40 corresponds to a Beam form Factor 28 and contains a value for the corresponding Beam form Factor 28.

As indicated in Step 26C, Parent Population 36A is generated either by Initial Population Generator 42 from the Maximum and Minimum Factor Values 34 from Step 26B and, in certain implementations, Initial Factors 28A, or by Cloning Generator 44 operating upon the Chromosomes 38B of a Surviving Population 36B, which will be discussed further below. As will be described below, the process for determining the M Element Groups 24 of N Array Elements 14 and the corresponding optimal M signal channel delay times of Signal Channels 22 to allow the desired formation and steering of beams by Non-homogenous/Non-uniform Acoustic Imaging System 10 will typically result in the method illustrated in FIG. 2 being iterated a number of times. As will be described, on the initial loop through the process, Parent Population 36A is generated by Initial Population Generator 42 and in subsequent, iterative loops through the process the subsequent Patent Populations 36A are generated by Cloning Generator 44.

In the case of Parent Population 36A being generated by Initial Population Generator 42, in the most general implementation of the system the value appearing in each Gene 40 corresponding to a Initial Factor 28A will be the value given or assumed in the initial conditions for the Array 12 and Array Elements 14. The value appearing in each Gene 40 corresponding to a Dependent Factor 28B, however, will fall within the range defined for the maximum and minimum values determined in Step 26B for the corresponding Dependent Factor 28B, that is, will fall between the maximum and minimum values of the corresponding Dependent Factor 28B. It will be appreciated, however, that the values of Initial Factors 28A are essentially constants for the process of determining, for example, the delay times and grouping of array elements to form a given beam, so that in many implementations of the present invention Genes 40 as generated by Initial Population Generator 42 will include only a Gene 40 for and corresponding to each of Dependent Factors 28B. Therefore, in a typical implementation as illustrated in FIG. 2, each Chromosome 38 of a Parent Population 36A generated by Initial Population Generator 42 will contain a Gene 40 for and corresponding to each Dependent Factor 28B and the value contained in each Gene 40 will fall within the range defined by the maximum and minimum values for the corresponding Dependent Factor 28B that will result in the optimum beam. Finally in this regard, it should be noted that each Chromosome 38A of a Parent Population 36A generated by Cloning Generator 44 will contain a Gene 40 for and corresponding to each Gene 40 contained in the Chromosomes 38A generated by Initial Population Generator 42.

In Step 26D, a Reproduction Processor 45 reproduces Chromosomes 38A of Parent Population 36A to generate a Child Population 36C of Chromosomes 38C by exchanging statistically selected matching pairs of Genes 40 of Chromosomes 38A of Parent Population 36A. Again, each Chromosome 38C of Child Population 36C represents a candidate beam that could be formed by Non-homogenous/Non-uniform Acoustic Imaging System 10 and is comprised of one or more Genes 40 wherein each Gene 40 of a Chromosome 38C is contributed by a Chromosome 38A of Parent Population 36A.

In Step 26E, a Mutation Processor 46 mutates statistically selected Genes 40 of the Chromosomes 38C of Child Population 36C to create a Mutated Population 36D of Chromosomes 38D wherein, again, each Chromosome 38D of Mutated Population 36D represents a candidate beam that could be formed by Non-homogenous/Non-uniform Acoustic Imaging System 10.

In Step 26F, a Fitness Processor 48 applies a Fitness Criteria 50 to each of the Chromosomes 38D of Mutated Population 36D to select as the Chromosomes 38B of Surviving Population 36B those Chromosomes 38D that satisfy a fitness threshold determined by Fitness Criteria 50. It should be noted that Surviving Population 36B will include the Chromosome 38D having the best fitness according to Fitness Criteria 50, regardless of whether that Chromosome 38D meets or exceeds the fitness threshold, so that at least the most fit member of Chromosomes 38D will survive to be a member of Surviving Population 36B. In general, Fitness Criteria 50 is based upon the optimum Beam form Factors 28 determined for Step 26A of the process, with Fitness Process 48 determining the best fit to the optimum Beam form Factors 28 by comparing each Chromosome 38D to the optimum Beam form Factors 28. The fitness threshold is typically defined as an allowable range of tolerance or difference between a beam defined by a Chromosome 38D and the optimum beam or beams.

As has been described, Chromosomes 38B of Surviving Population 36B are then provided to Cloning Generator 44 in Step 26C to be used in generating a new Parent Population 36A having the predetermined number of members, or Chromosomes 36A, for the next iteration through the process. In the presently preferred embodiment of the method of the present invention, the proportionate representation of each member of a Surviving Population 36B in a new Parent Population 36A is dependent upon and a function of the fitness of the member of the Surviving Population 36B as determined in Step 26F. That is, each member of Surviving Population 36B is cloned a number of times that is proportionate to its fitness when generating the new Parent Population 36A, so that more fit members of Surviving Population 36B are represented proportionally more frequently in the new Parent Population 36A.

The process is then repeated iteratively, with each new Parent Population 36A after the initial Parent Population 36A being generated by Cloning Generator 44 from Surviving Population 36B and the number of members in each new Parent Population 36A being constant.

Finally, in Step 26G, a Solution Criteria Processor 52 that has been monitoring each Surviving Population 36B in each iteration of the process detects that a final Surviving Population 36B has members, that is, Chromosomes 36B, meeting a predetermined solution criteria. As presently implemented, this solution criteria may be met when either the bestfitness of a Chromosome 38D of a current generation matches the best fitness of a Chromosome 38D of the previous generation to within a specified tolerance or when a specified number of iterations have been performed, usually based upon experience as to the number of iterations necessary for an acceptable result.

Solution Criteria Processor 52 then provides as an output the Genes 40 of the Chromosome 38B having the best fitness in the final iteration to determine the Beam form Factors 28, such as the phase delay time or times, to be used in generating the desired beam or beams. The choice of which of Array Elements 14 are members of each Element Group 24, and of the relationships, or connections, between Signal Channels 22 and Element Groups 24 are then determined for each Array Element 14 be the selection of the Beam form Factor 28 or Beam form Factors 28 that are closest in value to what the Beam form Factors 28 would be if each of Array Elements 14 where independently controllable, that is, if there were an independent Signal Channel 22 for each Array Element 14.

The transmitting/receiving array of an acoustic system, for example, may have transducer elements, such as piezoelectric elements, speakers or microphones, arranged as half cylinder of transducer elements organized in 8 rings by 18 staves or as a linear or curved array of elements, each comprised of a single element or of one or more sub-elements. In typical phased array acoustic system, the desired transmitting/receiving beams are formed by selecting the groupings of array elements and the connections between groups of array elements and the signal channels and by controlling the signal channel time delays, that is, the phase relationships, between signals sent to or received from each group of array elements.

In an exemplary acoustic system, the system may have 144 array elements and 18 independently controllable signal channels wherein any array element can be selectively connected to any signal channel. The method of the present invention as described above may, then be applied to find an optimum representation of 144 optimal delays, that is, one for each array element, by 18 time delay centroid values, or genes, that is, one for each signal channel. Stated another way, the optimum delays for the 144 array elements comprise a set of 144 numerical values scattered between some minimum and maximum values that are to be optimally represented by 18 numeric values determined according to the method of the present invention.

Accordingly, the method of the present invention is executed to create an initial Parent Population 36A of N members, or Chromosomes 38, for example, 50, wherein each Chromosome 38 contains 18 Genes 40. Each Gene 40 represents one of the 18 optimal delays to be assigned to a signal channel, and thus to a group of array elements, and the initial values of the 18 Genes 40 of the initial Parent Population 36A of Chromosomes 38 are selected by uniform random selection of 18 values between the maximum and minimum values of the 144 optimal delays. The 18 Gene 40 delays each represent a signal channel and thus a group of array elements and the 144 array elements are each initially assigned to a group represented by a Gene 40 according to the closeness of their respective optimum delays to the delay values of the Genes 40, that is, are assigned to the group having the closest of the 18 delay times represented by the Genes 40.

The fitness of each Chromosome 38 is then determined by an appropriate fitness criteria, such as the sum over a Chromosome 38's Genes 40 of the second moments of the Gene 40's optimum delays about the delay time value of the Gene 40. In this instance of this fitness criteria, the member of the population having the lowest fitness value, that is, the lowest sum of second moments, is the member having the best fit with the desired beam for that generation and members whose fitness value is greater than a selected threshold times the minimum fitness value found for that generation are discarded. A new population of N members is then generated by reproducing, or cloning, the surviving members in numbers proportional to N times the inverse of their normalized fitness values, and the process iterated for the selected number of iterations or until a fitness value falls within a selected tolerance.

Finally in this regard, an example of a program implementing the method of the present invention is presented in Appendix A wherein the program is expressed in the MATLAB programming language available from The Math Works. It will be noted therein that the various populations of Chromosomes 38 are organized and arranged in arrays and that members of each population are reproduced or cloned by replication of rows or columns of the arrays. It will also be noted that reproduction of Chromosomes 38, as in Step 26D, is by statistical selection and exchange of Genes 40 and is accomplished by exchange of vectors into the arrays pointing to matched pairs of the Genes 40 of the Chromosomes 38. Also, it will be noted that Chromosomes 38 are mutated, as in Step 26E, by statistical selection and variation of the values of Genes 40 within predetermined limits not exceed the previously determined maximum and minimum values of the genes.

Figure 3:
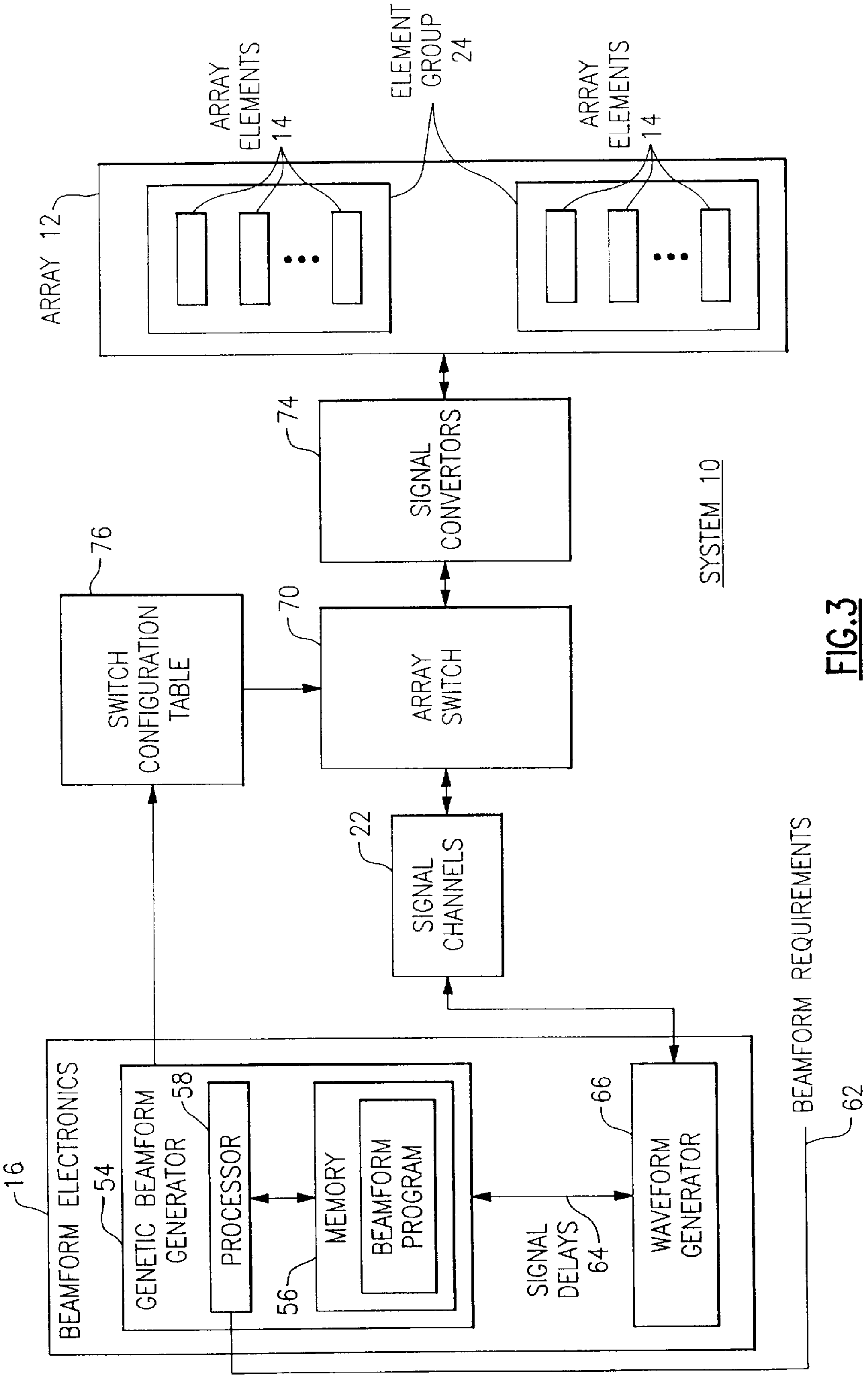
FIG. 3 is a detailed representation of a phased array non-homogenous/non-uniform acoustic imaging system in which the present invention is implemented.

Next referring to FIG. 3, therein is illustrated a more detailed representation of a Non-homogenous/Non-uniform Acoustic Imaging System 10 in which the present invention is implemented. As shown in FIG. 3, the signals are communicated between Beamforming Electronics 16 and Array Elements 14 through Signal Channels 22 wherein the number M of Signal Channels 22 is less than the number N of Array Elements 14. As has been discussed, Array Elements 14 are therefore grouped into Element Groups 24 wherein the Array Elements 14 in each of Element Groups 24 are connected to a corresponding one of Signal Channels 22 by Beamforming Electronics 16.

In a typical System 10, Beamforming Electronics 16 would include Genetic Beam form Generator 54, which would include Memory 56 and Processor 58 for executing Genetic Beam form Program 60 for performing the method of the present invention as described above. Genetic Beam form Generator 54 would be provided with inputs including Beam form Requirements 62 which, as described, could include at least certain of Initial Factors 28A, such as beam steering angles, while others of Initial Factors 28A may be stored in Memory 56.

Genetic Beam form Generator 54 generates and provides certain of Dependent Factors 28B to Waveform Generator 66, such as Signal Delays 64 as determined according to the method of the present invention, to control the relative time delays, that is, phase relationships, of Signals 68 generated by Waveform Generator 66. Signals 68 comprise the signals to be transmitted by an Array 12, as discussed above, and Waveform Generator 66 will generate at least a Signal 68 for each Signal Channel 22 to Array 12.

As represented in FIG. 3, the phase controlled Signals 68 from Waveform Generator 66 are provided to Array Switch 70 through Signal Channels 22 and Array Switch 70 in turn selectively connects Signal Channels 22 to the individual Array Elements 14 of Array 12. As indicated, Array Switch 70 is controlled by inputs from Switch Configuration Table 76, which stores and provides configurations of Array Switch 70 connections between Signals 68, that is, Signal Channels 22, and Array Elements 14. These connection configurations, which determine the connections between Signal Channels 22 and Array Elements 14, thereby determine the association of Array Elements 14 into Element Groups 24 and are provided from Genetic Beam form Generator 54 as yet others of Dependent Factors 28B as described above with respect to the method of the present invention.

As also represented in FIG. 3, System 10 may include Signal Converters 74 which may be connected between Array Switch 72 and Array Elements 14, as illustrated in FIG. 3, or, in other implementations, in Signal Channels 70 between Waveform Generator 66 and Array Switch 72, depending upon the characteristics of Signals 68 and the elements comprising, for example, Array Switch 72 and Array Elements 14. In an acoustic system, for example, Waveform Generator 66 may generate Signals 68 in digital form and Array Switch 72 may be comprised of digital switches with Signal Converters 74 comprising digital to analog signal converters.

Figure 4A:
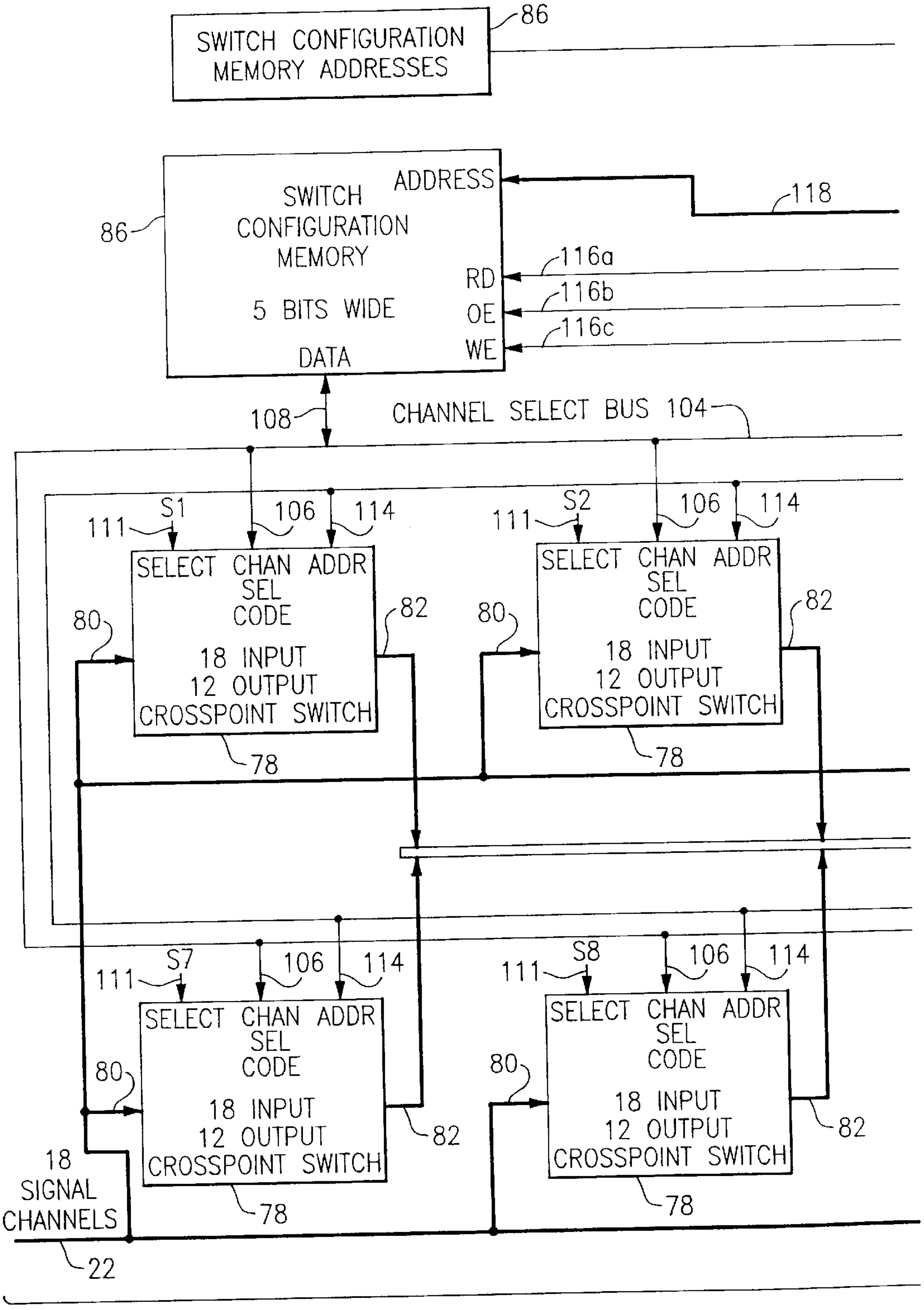
FIGS. 4A, 4B and 4C (hereinafter referred to as FIG. 4) combined is a block diagram of a switch configuration table and array switch of an implementation of the present invention.
Figure 4B:
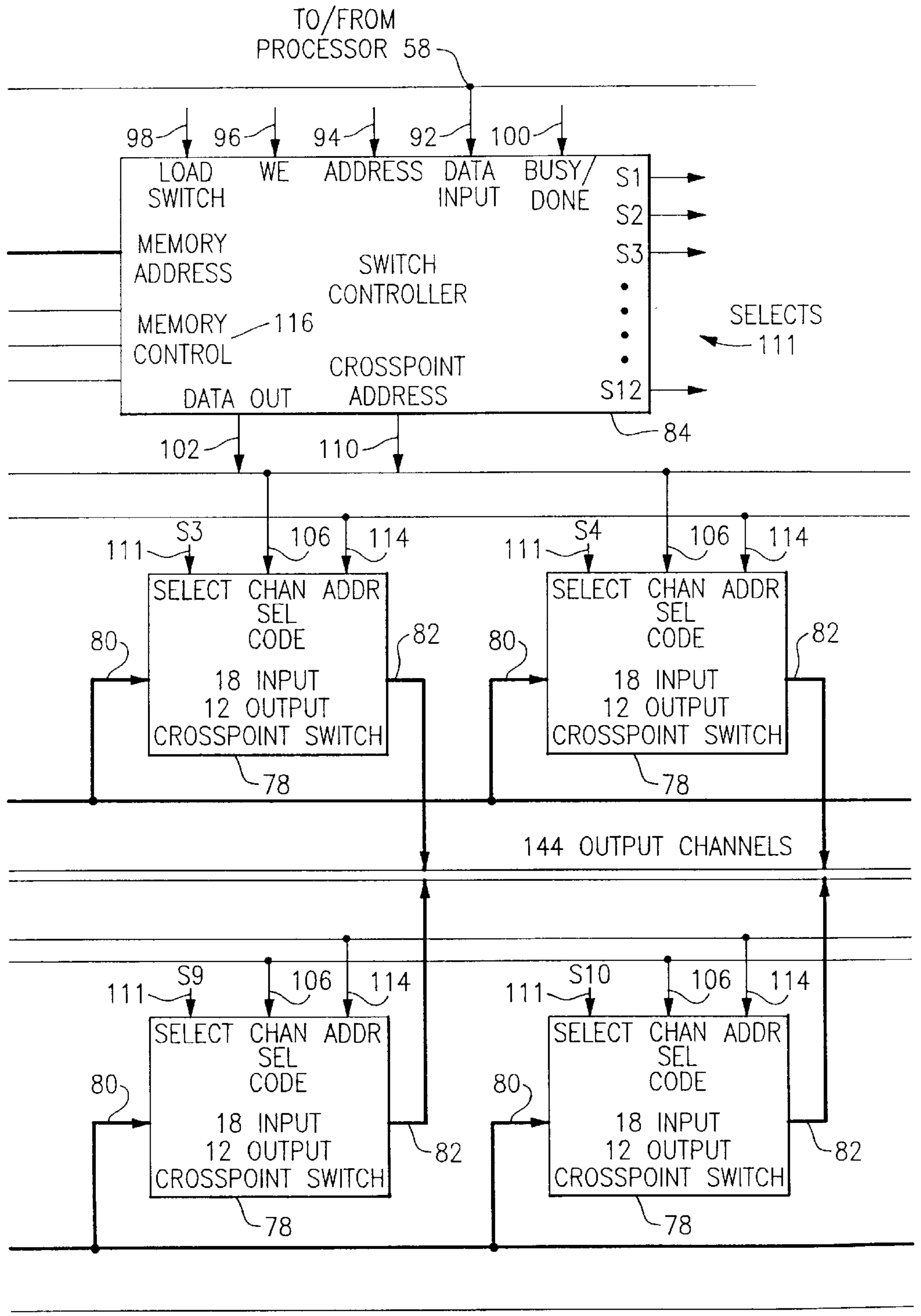
Figure 4C:
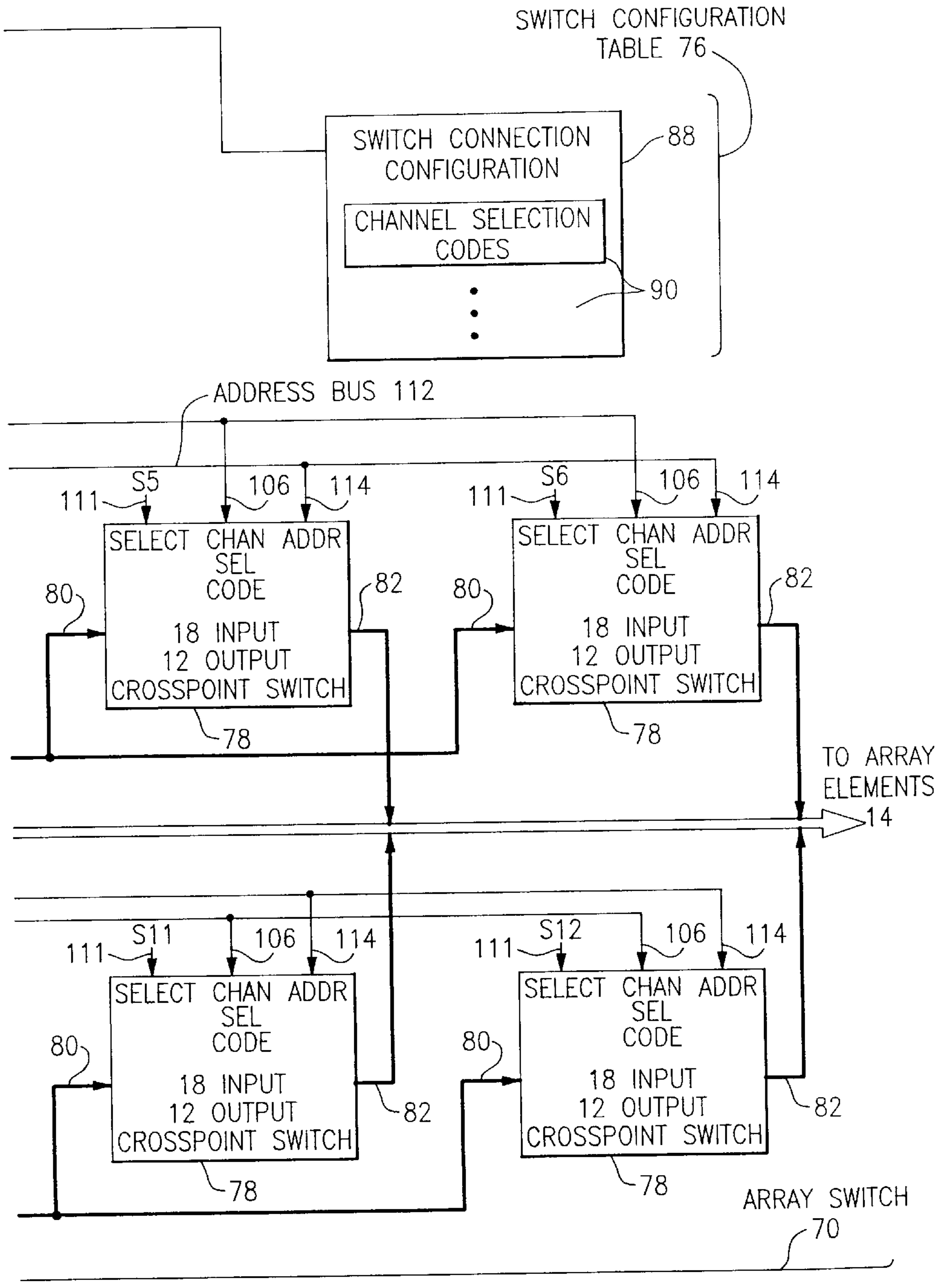

Referring to FIG. 4, therein is shown a block diagram of an exemplary embodiment, as may be implemented, for example, in standard hardware components, of an Array Switch 70 and Switch Configuration Table 76 for selectably connecting 18 Signal Channels 22 to 144 Array Elements 14 of an Array 12. As illustrated therein, Array Switch 70 includes 12 Crosspoint Switches 78 wherein each Crosspoint Switch 78 has 18 Inputs 80 and 12 Outputs 82 and operates to allow a signal on any of Inputs 80 to be selectably provided to any of Outputs 82. Each Crosspoint Switch 78 thereby functions as an sub-array of twelve 18 to 1 selecters whereby each of Outputs 82 may be separately and selectably connected to any of Inputs 80.

As indicated in FIG. 4, the 18 Inputs 80 of each of the 12 Crosspoint Switches 78 in Array Switch 70 are connected in parallel to corresponding ones of 18 Signal Channels 22. That is, and for example, a first Input 18 of each of Crosspoint Switches 78 is connected to a first Signal Channel 22, a second Input 18 of each of Crosspoint Switches 78 is connected to a second Signal Channel 22, and so on. Each Output 82 of each Crosspoint Switch 78, of which there are 144 (12×12), is in turn connected to a separate one of the 144 Array Elements 14. As such, each Array Element 14 may be connected through its corresponding Crosspoint Switch 78 with the Signal 68 appearing on any selected one of the 18 Signal Channels 22, so that Array Switch 70 operates as an 18 to 144 line crosspoint switch.

As shown in FIG. 4, in this exemplary implementation Switch Configuration Table 76 includes a Switch Controller 84 and a Switch Configuration Memory 86 wherein Switch Controller 84 is connected from Processor 58 to receive Switch Connection Configurations 88 defining the Array Switch 70 connections between Signal Channels 22 and Array Elements 144. As has been described, Switch Connection Configurations 88 are provided from Genetic Beam form Generator 54, which is implemented through Processor 58 and Beam form Program 60. Each Switch Connection Configuration 88 is comprised of M N-bit Channel Selection Codes 90 wherein M is the number of connections between Signal Channels 22 and Array Elements 14 to be provided through Crosspoint Switches 78 and is generally equal to the number of Array Elements 14 and N is the number of bits required to identify a specific Signal Channel 22 to be connected to a given Array Element 14. In the present example, therefore, each Switch Connection Configuration 88 is a set of 144 5 bit Channel Selection Codes 90 wherein 144 is the number of possible connections between Signal Channels 22 and Array Elements 14, and is equal to the number of Array Elements 14, and wherein a 5 bit word is required for each such connection to identify and select one of 18 Signal Channels 22.

In this implementation, the inputs to Switch Controller 84 include a Data Input 92 which receives from Processor 58 the Channel Selection Codes 90 of Switch Connection Configurations 88 and Connection Addresses 94 that identify the Crosspoint Switches 78 to which corresponding Channel Selection Codes 90 are assigned. In this regard, it will be noted that in the present exemplary implementation each Crosspoint Switch 78 provides 12 selectable connections between the 18 Signal Channels 22 and 12 corresponding Array Elements 14 of Array 12, so that each Crosspoint Switch 78 will receive 12 Channel Selection Codes 90.

Further in this regard, Data Input 92 also receives Switch Configuration Memory 86 addresses wherein the Channel Selection Codes 90 of Switch Connection Configurations 88 may be stored to be subsequently provided to Crosspoint Switches 78.

Other control connections between Processor 58 and Switch Controller 84 include a Write Enable (WE) 96 indicating when an input on Data Input 92 is to be received by Switch Controller 84, a Load Switch 98 command indicating whether Switch Controller 84 is to load Channel Selection Codes 90 into Crosspoint Switches 78 or into Switch Configuration Memory 86, and a Busy/Done signal 100 to control communications between Switch Controller 84 and Processor 58.

In the implementation shown in FIG. 4, Switch Controller 84 in turn provides three outputs to Crosspoint Switches 78 in the present implementation. The first output is a Data Output 102 connected through a Channel Select Bus 104 to Channel Select Codes Inputs 106 of Crosspoint Switches 78 through which Channel Selection Codes 90 are provided to Crosspoint Switches 78. It will be noted that Data Output 102 and Channel Select Bus 104 are also connected to Data Input/Output 108 of Switch Configuration Memory 86 to allow Channel Selection Codes 90 to be stored therein.

The second output from Switch Controller 84 to Crosspoint Switches 78 is Crosspoint Address 110, which is connected through Address Bus 1 12 to Address Inputs 114 of Crosspoint Switches 78 to address memory elements therein for storing corresponding Channel Selection Codes 90. In this regard, it has been described that in the present implementation each Crosspoint Switch 78 has the capability to provide connections between 12 Array Elements 12 and corresponding selected ones of Signal Channels 22. As such, each Crosspoint Switch 78 includes 12 switch elements, such as selecter circuits, each of which is controlled by a Channel Selection Code 90, and correspondingly includes 12 memory elements, which are addressed through Address Inputs 114, for storing the Channel Selection Codes 90.

Lastly, the third output from Switch Controller 84 to Crosspoint Switches 78 in the present implementation is a group of Switch Select Outputs(Selects) 111, which are used to select which of Crosspoint Switches 78 is to receive a given Channel Selection Code 90 while, as described above, Crosspoint Addresses 110 are used to select memory elements within the Crosspoint Switches 78 selected through Selects 111.

It will be noted with regard to the implementation illustrated in FIG. 4 that Switch Controller 84 and Crosspoint Switches 78 are constructed of field programmable gate arrays and that other implementations may result in changes in the detailed operation of Switch Controller 84 and Crosspoint Switches 78, in particular in the control and address signals used therebetween. Such changes and adaptations, however, will be well understood by those of ordinary skill in the relevant arts.

Finally, it has been described that Data Output 102 and Channel Select Bus 104 are connected to Data Input/Output 108 of Switch Configuration Memory 86 to allow Channel Selection Codes 90 to be stored therein for subsequent use in configuring the connections of Crosspoint Switches 78. As indicated in FIG. 4, and for this purpose, Data Input/Output 108 of Switch Configuration Memory 86 is a bidirectional connection, thereby allowing Channel Selection Codes 90 to be read -from Switch Configuration Memory 86 and to Channel Select Bus 104 to Crosspoint Switches 78 in the same manner as Channel Selection Codes 90 read directly from Switch Controller 84. It will be noted, however, that the Channel Selection Code 90 storage locations in Switch Configuration Memory 86 is not addressed by Switch Controller 84 through Crosspoint Address 110 and Address Bus 112, but directly from Switch Controller 84 through Switch Controller 84's Memory Control Output 116 and Memory Address Output 118. As shown, Memory Control Output 116 is comprised of three control signals, indicated as Read (RD) 116*a*, Output Enable (OE) 116*b* and Write Enable (WE) 116*c*, which are conventional control signals. Memory Address Output 118, in tum, provides the addresses of Switch Configuration Memory 86 storage locations that Channel Selection Codes 90 are to be written into or read from, thereby allowing the Channel Selection Codes 90 of Switch Connection Configurations 88 to be stored and later retrieved to reconfigure the beams formed by Array 12.

Figure 5A:
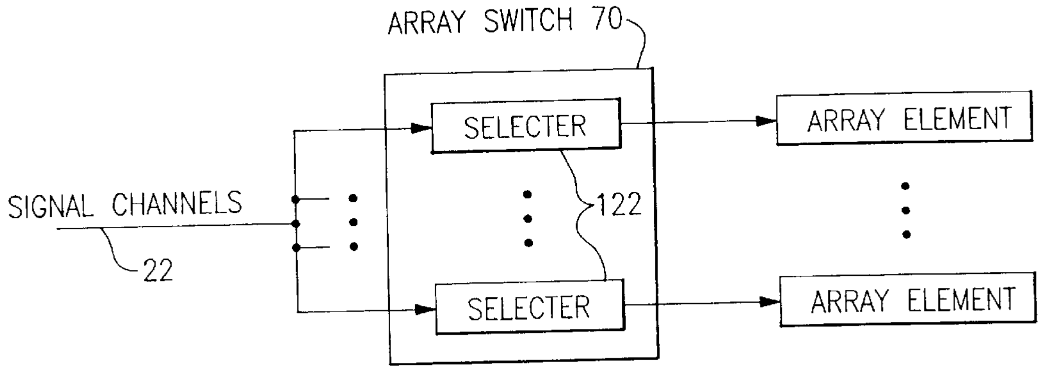
FIGS. 5A and 5B are block diagrams of a presently preferred embodiment of the present invention.
Figure 5B:
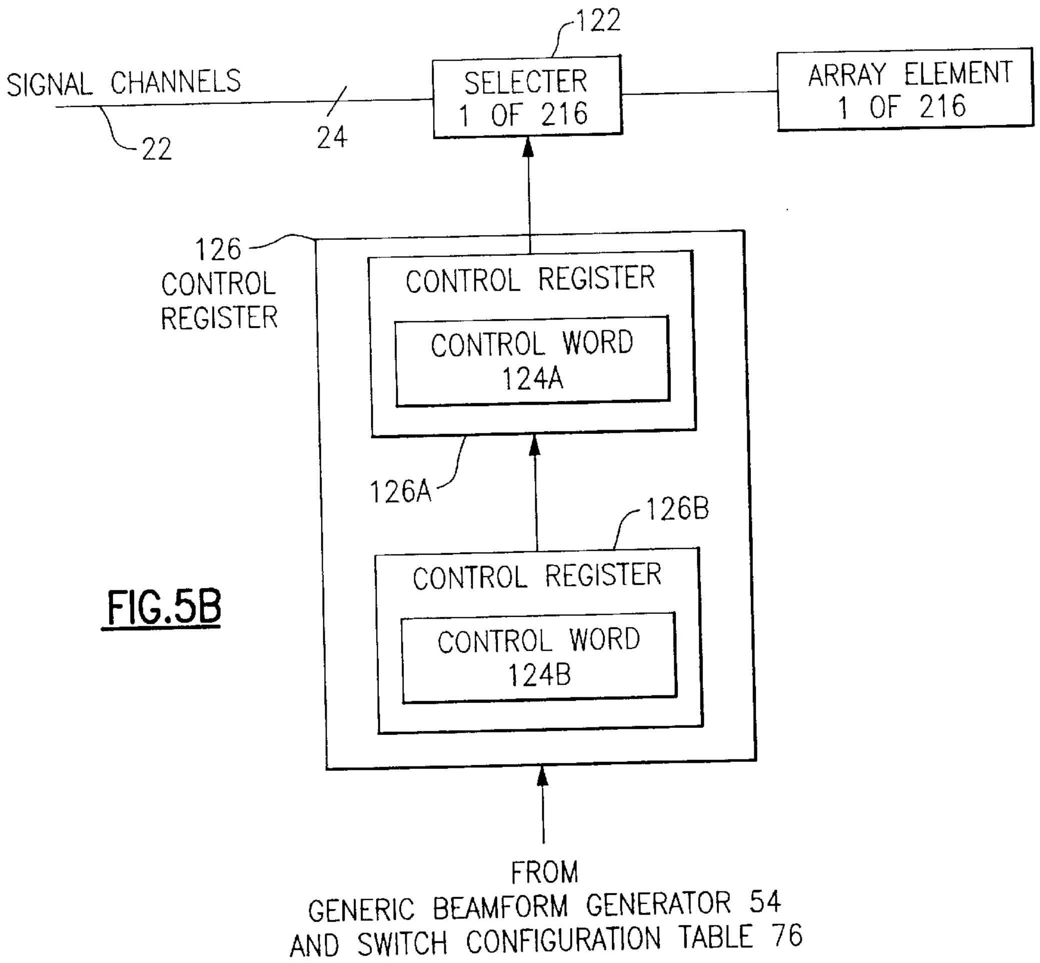

Referring finally to FIGS. 5A and 5B, therein is illustrated a presently preferred embodiment of Array Switch 70. As will be apparent from FIGS. 5A and 5B, Array Switch 70 is essentially a type of digital crosspoint switch wherein, in the presently preferred embodiment illustrated in FIGS. 5A and 5B, Array Switch 70 is comprised of a plurality of Selecters 122, each of which operate as a switching amplifier to maintain or control signal levels. In this embodiment, there is one Selecter 122 for each Array Element 14 and each Selecter 122 has an input for and corresponding to each Signal Channel 22, so that in an exemplary embodiment having, for example, 24 Signal Channels 22 and 216 Array Elements 14, Array Switch 70 would be comprised of 216 24-to-1 Selecters 122.

In order to create a beam of specified form and direction, each Selecter 122 is provided with a Control Word 124 which selects which of Signal Channels 22 the Selecter 122 will connect to the corresponding Array Element 14 connected from the output of the Selecter 122. In the exemplary implementation described above, therefore, 216 Control Words 124 are required to configure each beamformed by Array Switch 70, and each Control Word 124 is comprised of 5 bits wherein 5 bits are required to define and select, for each Selecter 122, a given one of Signal Channels 22.

As shown, Each Selecter 122 is provided with an associated Control Register 126 for storing and providing to the Selecter 122 a current Control Word 124 wherein Control Registers 126 are connected from Genetic Beam form Generator 54 and Switch Configuration Table 76. It will be noted that in the presently preferred embodiment, each Control Register 126 is comprised of a double buffer, represented as Control Registers 126A and 126B, to store a current Control Word 124A and a next Control Word 124B. This double buffer thereby allows a next beam configuration to be loaded into Control Registers 126 while Array Switch 70 is controlling Array Elements 14 to form a current beam configuration, and the next beam configuration to be activated on a single command that transfers the next Control Words 124B into Control Registers 126A to become the current Control Words 124A.

In the presently preferred embodiment, Control Registers 126 are memory mapped into the address space of a control microprocessor, such as Processor 58, and a beam configuration is loaded into Control Registers 126 by performing the required number of writes of Control Words 124 into Control Register 126, for example, 216 in the above exemplary embodiment. It will also be noted that Switch Configuration Table 76 may be embodied in the memory space of, for example, Memory 56, or implemented as a separate memory device of the required capacity associated with Array Switch 70.

Also in the presently preferred embodiment, Array Switch 70 is implemented in programmable logic devices distributed across a number of circuit boards, such as three circuits boards in the exemplary embodiment described above, and the basic building block of an Array Switch 70 is a device containing, for example, 14 Selecters 122. Appendix B contains the design of a single 42 to 1 Selecter 122 in the file titled "mproutm.tdf", and the design of a programmable logic device containing 14 such Selecters 122 is contained in the file titled "p3map.tdf". These files are written in the AHDL programming language, a vendor specific dialect of VHDL, which is a standard hardware design language. In the exemplary implementation, each circuit board contains 7 programmable logic devices, wherein Appendix B contains a schematic diagram for one such circuit board, and 3 such circuit boards are used, for example, to implement 216 Selecters 122. Appendix B also contains the source code for the programmable logic devices used to construct a complete Array Switch 70 for the above described example.

Lastly, it will be readily understood by those of ordinary skill in the relevant arts that although System 10 has been discussed herein just above in terms of the transmission of signals, the system may also be used for the receiving of signals, or both the transmission and receiving of signals. For example, Waveform Generator 66 would include signal processing electronics and the time/phase delays would applied to the received signals rather than the transmitted signals while Signal Converters 74 would, for example, include analog to digital signal converters as well as, or instead of, digital to analog signal converters.

In conclusion, while the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. The adaptation of the method and apparatus of the present invention to various widely divergent types of phase array transmitting and receiving systems will be readily apparent to those of ordinary skill in the relevant arts. For example, it will be recognized by those of ordinary skill in the relevant arts that methods applied to an ultrasonic medial imaging system may be equally applied to a geological imaging or profiling system be adaptation of the spacing and sizing of the transmitting and receiving elements of the phased array and the operating frequencies of the system according to the frequencies of the beam signals that are optimum for the respective systems; that is, an ultrasonic medical system will use frequencies in the ultrasonic ranges and the phased array elements and spacing among elements will be sized proportionally while a geological system will generally operate in the acoustic or sub-acoustic range and the phased array elements and spacing among elements will again be sized proportionally. Likewise, it will be recognized that a medical imaging system will generally require the phased array and therefore that the switching array and associated circuits to both transmit and receive. The adaptation of, for example, the switching array for both transmission and reception by containing both multiplexing and demultiplexing connections between the array elements and signal channels will, however, be apparent. It will similarly be recognized that a geological imaging or profiling system frequently uses a transmitting element, such as one or more explosive charges, that are separate from the receiving phased array, so that the phased array is required to form only receiving beams; the adaptation of the above described system for reception only, however, will be well understood by those of ordinary skill in the arts. Therefore, it is the object of the appended claims to cover all such variation and modifications of the invention as come within the true spirit and scope of the invention.

What is claimed is:

1. A method for use in a non-homogenous/non-uniform acoustic imaging system for determining beamform factors for forming acoustic beams approximating an optimum acoustic beam for the directional transmission or reception of acoustic energy in a non-homogenous/non-uniform medium by an acoustic phased array system including a first plurality of elements connectable to a second plurality of signal channels wherein the first plurality is greater than the second plurality, comprising the steps of:

(a) from a set of initial beamform factors, determining at least one dependent beamform factor of at least one optimum beam to be formed by the acoustic phased array system, (b) determining the maximum and minimum values of the dependent beamform factors, (c) generating a parent population of chromosomes wherein each chromosome includes a gene for and corresponding to each dependent beamform factor and represents a candidate beamformed by the acoustic phased array system for the initial beamform factors and the dependent beamform factors represented by the genes of the chromosome, by (1) generating a first parent population wherein the value of each gene corresponding to a dependent beamform factor has a value between the maximum and minimum values of the corresponding dependent beamform factor and (2) generating a subsequent parent population by cloning of the chromosomes of a surviving population, (d) generating a child population from the parent population by exchanging statistically selected pairs of genes of the chromosomes of the parent population, (e) generating a mutated population from the child population by mutating statistically selected genes of the child population, (f) selecting the surviving population from the mutated population by comparing the chromosomes of the mutated population with a fitness criteria based upon an optimum beamform factor and selecting for the surviving population the chromosomes of the mutated population meeting the fitness criteria, and (g) comparing the chromosomes of the surviving population with a solution criteria and when at least one chromosome of the surviving population meets the solution criteria providing the genes of the chromosome of the surviving population having the best match to the fitness criteria as the dependent factors for forming a beam approximating the optimum beam.

2. The method of claim 1 for use in for determining beamform factors for forming acoustic beams approximating an optimum acoustic beam for the directional transmission or reception of acoustic energy in a non-homogenous/non-uniform medium by a phased array non-homogenous/non-uniform acoustic imaging system including a first plurality of elements connectable to a second plurality of signal channels wherein the first plurality is greater than the second plurality, wherein:

the solution criteria is a predetermined number of iterations of the generation of a surviving population.

3. The method of claim 1 for use in a non-homogenous/non-uniform acoustic imaging system for determining beamform factors for forming acoustic beams approximating an optimum acoustic beam for the directional transmission or reception of acoustic energy in a non-homogenous/non-uniform medium by a phased array non-homogenous/non-uniform acoustic imaging system including a first plurality of elements connectable to a second plurality of signal channels wherein the first plurality is greater than the second plurality, wherein:

the solution criteria is a predetermined tolerance of difference between a chromosome of a current surviving population having the best match to the fitness criteria and a chromosome of a preceding surviving population having the best match to the fitness criteria and the solution criteria is met when the difference between the chromosome having the best match to the fitness criteria of the current surviving population is within the predetermined tolerance of difference from the chromosome of the preceding surviving population.

4. The method of claim 1 for use in a non-homogenous/non-uniform acoustic imaging system for determining beamform factors for forming acoustic beams approximating an optimum acoustic beam for the directional transmission or reception of acoustic energy in a non-homogenous/non-uniform medium by a phased array non-homogenous/non-uniform acoustic imaging system including a first plurality of elements connectable to a second plurality of signal channels wherein the first plurality is greater than the second plurality, wherein:

the fitness criteria is a predetermined tolerance of difference between a beamformed by the genes of a chromosome of a current surviving population and the optimum beam.

5. The method of claim 1 for use in a non-homogenous/non-uniform acoustic imaging system for determining beamform factors for forming acoustic beams approximating an optimum acoustic beam for the directional transmission or reception of acoustic energy in a non-homogenous/non-uniform medium by a phased array non-homogenous/non-uniform acoustic imaging system including a first plurality of elements connectable to a second plurality of signal channels wherein the first plurality is greater than the second plurality, wherein:

each parent generation is generated in step (c) to have a constant number of chromosomes.

6. The method of claim 1 for use in a non-homogenous/non-uniform acoustic imaging system for determining beamform factors for forming acoustic beams approximating an optimum acoustic beam for the directional transmission or reception of acoustic energy in a non-homogenous/non-uniform medium by a phased array non-homogenous/non-uniform acoustic imaging system including a first plurality of elements connectable to a second plurality of signal channels wherein the first plurality is greater than the second plurality, wherein:

the chromosomes of each surviving population are cloned to generate a new parent population so that the proportionate representation of each chromosome of a surviving population in a new parent population is proportionate to a measure of fitness of the chromosome of the surviving population with respect to the fitness criteria.

7. The method of claim 1 for use in a non-homogenous/non-uniform acoustic imaging system for determining beamform factors for forming acoustic beams approximating an optimum acoustic beam for the directional transmission or reception of acoustic energy in a non-homogenous/non-uniform medium by a non-homogenous/non-uniform acoustic imaging system including a first plurality of elements connectable to a second plurality of signal channels wherein the first plurality is greater than the second plurality, wherein:

the chromosome of a surviving population having a best measurement of fitness with respect to the fitness criteria will be represented in the parent population cloned from the surviving population.

8. The method of claim 1 for use in a non-homogenous/non-uniform acoustic imaging system for determining beamform factors for forming acoustic beams approximating an optimum acoustic beam for the directional transmission or reception of acoustic energy by a phased array non-homogenous/non-uniform acoustic imaging system including a first plurality of elements connectable to a second plurality of signal channels wherein the first plurality is greater than the second plurality, wherein:

each chromosome of a child population is generated by statistical selection and exchange of genes of chromosomes of the parent population.

9. The method of claim 1 for use in a non-homogenous/non-uniform acoustic imaging system for determining beamform factors for forming acoustic beams approximating an optimum acoustic beam for the directional transmission or reception of acoustic energy in a non-homogenous/non-uniform medium by a phased array non-homogenous/non-uniform acoustic imaging system including a first plurality of elements connectable to a second plurality of signal channels wherein the first plurality is greater than the second plurality, wherein:

each mutated generation is generated by statistical selection and variation of the values of the genes of corresponding chromosomes of the child generation within predetermined limits.

10. An apparatus for use in a non-homogenous/non-uniform acoustic imaging system for determining beamform factors for forming acoustic beams approximating an optimum acoustic beam for the directional transmission or reception of acoustic energy in a non-homogenous/non-uniform medium by a phased array non-homogenous/non-uniform acoustic imaging system including a first plurality of elements connectable to a second plurality of signal channels wherein the first plurality is greater than the second plurality, comprising:

(a) a dependent beam factor processor for determining from a set of initial beamform factors at least one dependent beamform factor of at least one optimum beam to be formed by the phased array non-homogenous/non-uniform acoustic imaging system, (b) a maximum/minimum value processor for determining the maximum and minimum values of the dependent beamform factors, (c) a parent population generator for generating a parent population of chromosomes wherein each chromosome includes a gene for and corresponding to each dependent beamform factor and represents a candidate beamformed by the phased array non-homogenous/non-uniform acoustic imaging system for the initial beamform factors and the dependent beamform factors represented by the genes of the chromosome, by (1) generating a first parent population wherein the value of each gene corresponding to a dependent beamform factor has a value between the maximum and minimum values of the corresponding dependent beamform factor and (2) generating a subsequent parent population by cloning of the chromosomes of a surviving population, (d) a child population generator for generating a child population from the parent population by exchanging statistically selected pairs of genes of the chromosomes of the parent population, (e) a mutated population generator for generating a mutated population from the child population by mutating statistically selected genes of the child population, (f) a surviving population generator for selecting the surviving population from the mutated population by comparing the chromosomes of the mutated population with a fitness criteria based upon an optimum beamform factor and selecting for the surviving population the chromosomes of the mutated population meeting the fitness criteria, and (g) a solution processor for comparing the chromosomes of the surviving population with a solution criteria and when at least one chromosome of the surviving population meets the solution criteria providing the genes of the chromosome of the surviving population having the best match to the fitness criteria as the dependent factors for forming a beam approximating the optimum beam.

11. A non-homogenous/non-uniform acoustic imaging system for determining beamform factors for forming acoustic beams approximating an optimum acoustic beam for the directional transmission or reception of acoustic energy in a non-homogenous/non-uniform medium by a phased array non-homogenous/non-uniform acoustic imaging system including a first plurality of elements connectable to a second plurality of signal channels wherein the first plurality is greater than the second plurality, comprising:

a beamform processor including a memory and a processor for executing a beamform process and generating from initial beamform factors first and second dependent beamform factors, a waveform processor connected to the signal channels and responsive to the first dependent beamform factors for applying the first dependent beamform factors to a corresponding second plurality of element group signals, an array switch connected between the signal channels and the array elements and responsive to the second dependent beamform factors for selectively connecting the signal channels to the array elements of the element groups, and a switch configuration table connected from the beamform generator and to the array switch for storing and providing to the array switch the second dependent beamform factors, wherein the beamform process executed by the beamform generator includes (a) determining from a set of initial beamform factors at least one dependent beamform factor of at least one optimum beam to be formed by the phased array non-homogenous/non-uniform acoustic imaging system, (b) determining the maximum and minimum values of the dependent beamform factors, (c) generating a parent population of chromosomes wherein each chromosome includes a gene for and corresponding to each dependent beamform factor and represents a candidate beamformed by the phased array non-homogenous/non-uniform acoustic imaging system for the initial beamform factors and the dependent beamform factors represented by the genes of the chromosome, by (1) generating a first parent population wherein the value of each gene corresponding to a dependent beamform factor has a value between the maximum and minimum values of the corresponding dependent beamform factor and (2) generating a subsequent parent population by cloning of the chromosomes of a surviving population, (d) generating a child population from the parent population by exchanging statistically selected pairs of genes of the chromosomes of the parent population, (e) generating a mutated population from the child population by mutating statistically selected genes of the child population, (f) selecting the surviving population from the mutated population by comparing the chromosomes of the mutated population with a fitness criteria based upon an optimum beamform factor and selecting for the surviving population the chromosomes of the mutated population meeting the fitness criteria, and (g) comparing the chromosomes of the surviving population with a solution criteria and when at least one chromosome of the surviving population meets the solution criteria providing the genes of the chromosome of the surviving population having the best match to the fitness criteria as the first and second dependent factors for forming a beam approximating the optimum beam.

12. The system of claim 11 for determining beamform factors for forming acoustic beams approximating an optimum acoustic beam for the directional transmission or reception of acoustic energy in a non-homogenous/non-uniform medium by a phased array non-homogenous/non-uniform acoustic imaging system including a first plurality of elements connectable to a second plurality of signal channels wherein the first plurality is greater than the second plurality, wherein:

the waveform processor is a signal generator and the corresponding second plurality of element group signals are signals to be emitted by the array elements of the corresponding element groups.

13. The system of claim 11 for determining beamform factors for forming acoustic beams approximating an optimum acoustic beam for the directional transmission or reception of acoustic energy in a non-homogenous/non-uniform medium by a phased array non-homogenous/non-uniform acoustic imaging system including a first plurality of elements connectable to a second plurality of signal channels wherein the first plurality is greater than the second plurality, wherein:

the waveform processor is a signal processor and the corresponding second plurality of element group signals are signals received by the array elements of the corresponding element groups.

* * * * *